United States Patent Office 3,786,018
Patented Jan. 15, 1974

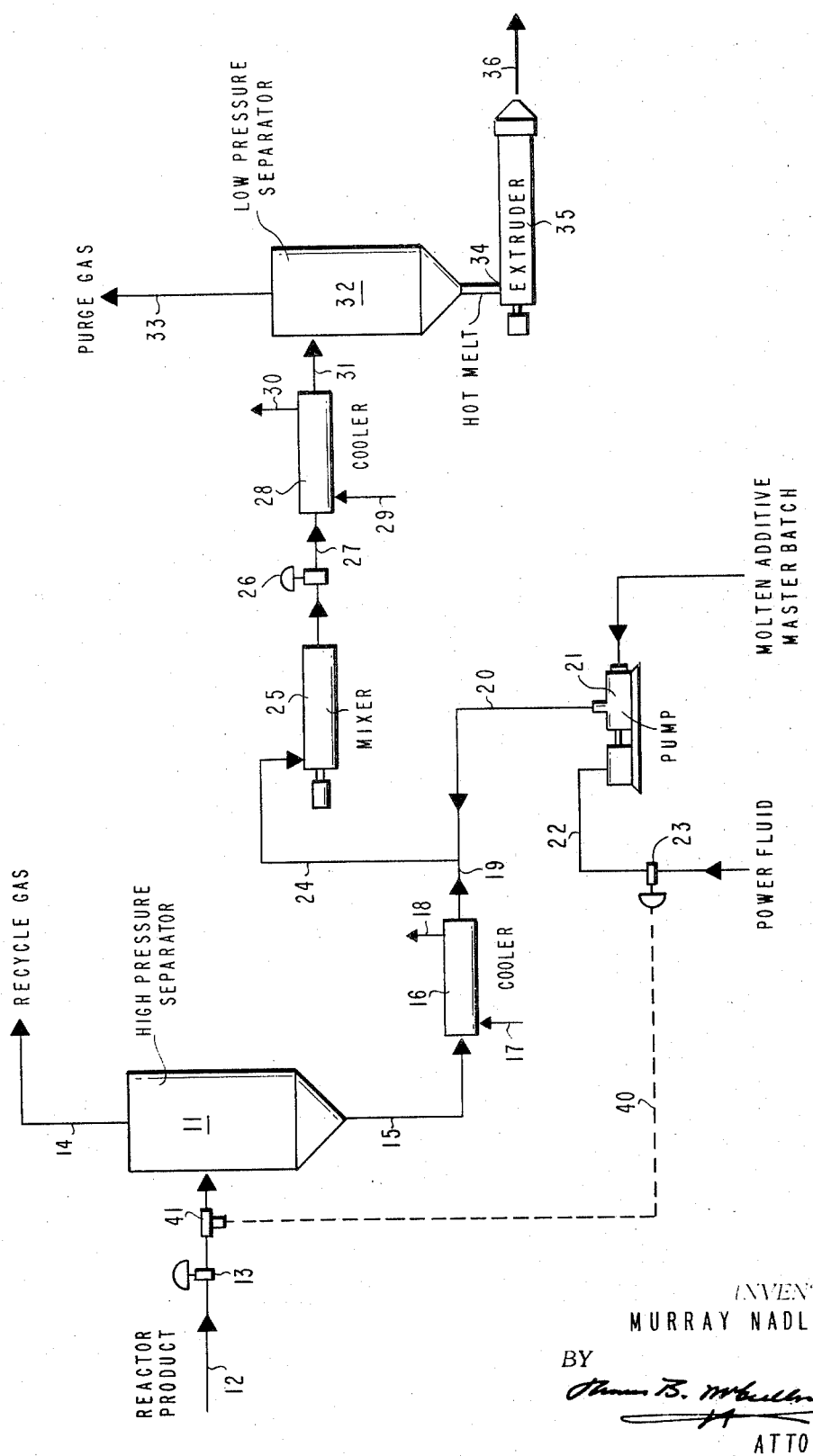

3,786,018
INTRODUCING ADDITIVES IN POLYOLEFINS
Murray Nadler, Baton Rouge, La., assignor to Esso Research and Engineering Company
Filed Oct. 7, 1971, Ser. No. 187,490
Int. Cl. B01f 3/10; C08f 45/44, 45/58
U.S. Cl. 260—32.6 PQ    8 Claims

ABSTRACT OF THE DISCLOSURE

Molten additives are introduced into molten polyolefin, such as polyethylene, under pressure and a homogenous mixture is obtained by intensely mixing the polyolefin and additive while reducing the pressure of the mixture.

BACKGROUND OF THE INVENTION

(1) Field of the invention

The present invention is directed to introducing additives in polyolefins. More particularly, it is concerned with the introduction of molten additives into molten polyolefins. In its more specific aspects, the invention is concerned with introducing molten additives into molten polyethylene under pressure while reducing the pressure of the molten polyethylene.

(2) The prior art

Heretofore it has been the practice to incorporate additives in low density, high optical quality polyethylene by mixing polyethylene pellets from hot melt extruders with a small amount of additive masterbatch pellets and homogenizing the pellet mixture in a Banbury mixer, a Farrel Continuous Mixer, a homogenizing extruder or other plastic mixing devices which intensively work the additives into the polyethylene pellets. This not only is expensive and adds costly operations but is necessary to produce film resins of high optical qualities.

In accordance with the present invention, a new and unobvious result is produced by introducing the additive into the molten polyolefin while its pressure is being reduced.

SUMMARY OF THE INVENTION

The present invention may be briefly described and summarized as involving a method for producing polyolefins, such as polyethylene and the like, containing additives which give the polyolefin good optical properties. In its more specific aspects, the invention involves introducing molten additives in a polyolefin hot melt under an elevated temperature and pressure wherein the temperature and pressure are reduced from a range from about 4000 to 5000 p.s.i. to approximately atmospheric pressure and a temperature from about 450 to 600° F. to about 350 to about 550° F. In this particular operation, the molten additives are introduced into the polyolefin hot melt during pressure and temperature reduction whereby the molten additive is homogenized in the hot melt to provide a polyolefin product of improved optical properties, the molten additive being introduced responsive to a signal from the reactor and in accordance with the rate of production of the molten polyolefin. The invention has particular application to low density polyethylene.

BRIEF DESCRIPTION OF THE DRAWING

The present invention will be more fully illustrated by reference to the drawing in which the single figure is a flow diagram of a preferred mode and embodiment.

BRIEF DESCRIPTION OF THE PREFERRED MODE AND EMBODIMENT WITH RELATION TO THE DRAWING

Referring now to the drawing and particularly to the single figure, numeral 11 designates the high pressure separator of a polyethylene reaction system operating at a pressure from about 4000 to 6000 p.s.i. and receiving reactor product such as polyethylene through line 12 controlled by valve 13. Line 12 receives the molten polyethylene directly from the reactor coils or autoclave in a high pressure polyethylene operation producing low density polyethylene, for example. In high pressure separators, the pressure is reduced to about 4000 to 6000 p.s.i. and recycle gas is removed by line 14 for returning to the feed stream. The molten polymer is withdrawn by line 15 into a cooling means 16 through which a cooling fluid such as water circulates by lines 17 and 18 to reduce the temperature. This temperature reduction was not required in previous operation but is beneficial with this additive blending procedure in reducing thermal decomposition of heat sensitive additives and increasing blending efficiency through increasing melt viscosity. The cooled polyethylene discharges from cooling means 16 by line 19 and is met by a master additive batch in molten condition introduced by line 20 having a pump 21 therein which is controlled by steam or electricity through line 22. A control means or valve 23 is connected by means 40 to a flow rate indicator means 41 in line 12 which in turn controls the flow of additive in accordance with the rate of production of reactor product passing through line 12.

The molten polyethylene in line 19 in admixture with the molten additive masterbatch introduced by line 20 flows by line 24 into an intensive line mixer 25 where it is thoroughly mixed. However, most of the mixing occurs by virtue of valve 26 which reduces the pressure from about 4000 to 6000 pounds to about atmospheric, say from about atmospheric to about 15 or 20 p.s.i.g. This valve can be specifically constructed to convert a maximum of pressure potential energy available into shear work to promote good mixing of additives into the polymer. In any event, the reduction in pressure of the molten polyethylene containing the master additive batch in a molten condition is homogeneously mixed by the pressure differential and flows by line 27 into a cooling means 28 provided with lines 29 and 30 by way of which cooling fluids such as water circulate. This cooling is beneficial in reducing evaporative losses of additives in subsequent processing.

The cooled homogenously mixed polyethylene having additives of good optical properties discharges by line 31 into a low pressure separator 32 from whence purge gas, that is gases remaining, is withdrawn by line 33. The homogenously mixed polyethylene discharges by opening 34 into a hot melt extruder 35 and is further mixed before discharging as pellets through line 36.

It will be seen from the foregoing description taken with the drawing that a simple, readily adaptable process or method is provided for homogenously mixing master additive batches of additives into the polyethylene by taking advantage of the pressure differential between the high pressure separator and the low pressure separator in a high pressure polyethylene system.

The additives which may be added suitably may comprise the various compounds: Ionol*, Superfloss (silica), erucamide, stearamide, oleamide, and the like. While these additives may be used, it is contemplated that others may also be employed in a similar manner. Also the master batch mixture may comprise Ionol, silica, erucamide and polyethylene. Other members of additives may be used as desired.

The present invention is quite advantageous and useful in that a process and method are provided for producing polyethylene of good optical properties without providing expensive extra equipment and operations. In other words, in the present invention the pressure drop from the high ---
*2,6-ditertiary butyl-4-methyl phenol.

pressure separator to the low pressure separator is employed to cause the mixing. This is new and unobvious and is quite useful.

The nature and objects of the present invention having been completely described and illustrated and the best mode contemplated set forth, what I wish to claim as new and useful and secure by Letters Patent is:

1. An improved process for incorporating one or more additives into molten polyolefins to obtain a homogeneous mixture with good optical properties, wherein said molten polyolefins are received from a high temperature-high pressure reaction, which process comprises the steps in combination of:
   (a) reducing the pressure of said molten polyolefin as it is received from said reaction, from a range of about 4,000 to 6,000 p.s.i. to approximately atmospheric;
   (b) introducing said additives in molten polyolefin at a rate proportional to the amount of said polyolefin received from said reaction well before said polyolefin reaches said approximate atmospheric condition of pressure; and
   (c) thereby utilizing the driving force of the reduction of said 4,000 to 6,000 p.s.i. pressure head in order to thoroughly mix said molten additive with said molten polyolefin.

2. A method in accordance with claim 1 in which the polyolefin is low density polyethylene.

3. A method in accordance with claim 6 in which the temperature is about 540° F. and the pressure about 4500 p.s.i. and these are reduced to about 5 p.s.i. and 400° F.

4. A method in accordance with claim 1 in which the molten additive and polyolefin hot melt are cooled both before and after mixing.

5. A method in accordance with claim 1 in which the molten additive and polyolefin are cooled after mixing and then extruded.

6. A process according to claim 1 wherein said molten polyolefin mixture is cooled from the range of about 450° to 600° F. to the range of about 350° F. to about 550° F. before introducing said molten additive.

7. A process according to claim 1 wherein said driving force is converted into shear work.

8. A process according to claim 1 wherein said additive is selected from the group consisting of:
   2,6-ditertiary butyl-4-methyl phenol, erucamide, stearamide and oleamide.

References Cited
UNITED STATES PATENTS

| | | | |
|---|---|---|---|
| 2,938,879 | 5/1960 | Mock et al. | 260—32.6 PQ |
| 3,121,914 | 2/1964 | Olson et al. | 264—211 |
| 3,222,191 | 12/1965 | Steiner et al. | 264—176 R |

ALLAN LIEBERMAN, Primary Examiner

T. DE BENEDICTIS, Sr., Assistant Examiner

U.S. Cl. X.R.

23—285; 259—7, 8; 260—34.2, 41 A, 45.9, 45.95